US012480642B2

(12) United States Patent
Feit

(10) Patent No.: US 12,480,642 B2
(45) **Date of Patent: *Nov. 25, 2025**

(54) ADJUSTABLE RECESSED LIGHT FIXTURE

(71) Applicant: Feit Electric Company, Inc., Pico Rivera, CA (US)

(72) Inventor: Alan Barry Feit, Encino, CA (US)

(73) Assignee: Feit Electric Company, Inc., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,085

(22) Filed: Feb. 1, 2024

(65) Prior Publication Data

US 2024/0167670 A1 May 23, 2024

Related U.S. Application Data

(63) Continuation of application No. 17/809,412, filed on Jun. 28, 2022, now Pat. No. 11,920,766, which is a continuation of application No. 17/065,956, filed on Oct. 8, 2020, now Pat. No. 11,402,082, which is a continuation of application No. 16/786,556, filed on Feb. 10, 2020, now Pat. No. 10,837,626, which is a continuation of application No. 16/368,993, filed on Mar. 29, 2019, now Pat. No. 10,598,354, which is a continuation of application No. 15/158,159, filed on May 18, 2016, now Pat. No. 10,288,266.

(Continued)

(51) Int. Cl.

| | |
|---|---|
| ***F21V 21/14*** | (2006.01) |
| ***F21K 9/237*** | (2016.01) |
| ***F21S 8/02*** | (2006.01) |
| ***F21V 19/00*** | (2006.01) |
| *F21K 9/65* | (2016.01) |
| *F21V 17/00* | (2006.01) |
| *F21Y 115/10* | (2016.01) |

(52) U.S. Cl.

CPC .......... *F21V 19/0065* (2013.01); *F21K 9/237* (2016.08); *F21S 8/026* (2013.01); *F21K 9/65* (2016.08); *F21V 17/002* (2013.01); *F21V 21/14* (2013.01); *F21Y 2115/10* (2016.08)

(58) Field of Classification Search

None

See application file for complete search history.

(56) References Cited

U.S. PATENT DOCUMENTS

| | | | |
|---|---|---|---|
| 4,327,402 | A | 4/1982 | Aubrey |
| 8,297,807 | B1 | 10/2012 | Chen |

(Continued)

*Primary Examiner* — Thien M Le

*Assistant Examiner* — April A Taylor

(74) *Attorney, Agent, or Firm* — Alston & Bird LLP

(57) ABSTRACT

Various embodiments are directed to an adjustable light fixture and method of installing the same. Various embodiments of the adjustable light fixture comprise a light head comprising a light source, a lens, and a frame; a socket base configured to be secured relative to a socket of a light assembly; and an extender located between the light head and the socket base and configured to move between an extended configuration and a compressed configuration. In various embodiments, the adjustable light fixture is installed by engaging the socket base with a corresponding socket of a light assembly and adjusting the extender toward the compressed configuration.

17 Claims, 4 Drawing Sheets

Related U.S. Application Data

(60) Provisional application No. 62/163,287, filed on May 18, 2015.

(56) References Cited

U.S. PATENT DOCUMENTS

| | | | | |
|---|---|---|---|---|
| 8,814,459 | B1 | 8/2014 | Berge | |
| 10,288,266 | B2 | 5/2019 | Feit | |
| 10,598,354 | B2 | 3/2020 | Feit | |
| 10,837,626 | B2 | 11/2020 | Feit | |
| 11,402,082 | B2 | 8/2022 | Feit | |
| 11,920,766 | B2 * | 3/2024 | Feit | F21K 9/237 |
| 2010/0225220 | A1 | 9/2010 | Tanaka et al. | |
| 2011/0075422 | A1 | 3/2011 | Van et al. | |
| 2013/0114261 | A1 | 5/2013 | Scianna et al. | |
| 2013/0265764 | A1 * | 10/2013 | Holman | F21V 19/02<br>362/249.02 |
| 2013/0294098 | A1 | 11/2013 | Yeh | |
| 2014/0191683 | A1 | 7/2014 | Gaines et al. | |
| 2017/0089556 | A1 | 3/2017 | Ticktin et al. | |
| 2018/0023785 | A1 | 1/2018 | Chien | |

* cited by examiner

ADJUSTABLE RECESSED LIGHT FIXTURE

CROSS-REFERENCE TO RELATED APPLICATIONS

This patent application is a continuation of U.S. Nonprovisional patent Ser. No. 17/809,412, filed Jun. 28, 2022, which is a continuation of U.S. Nonprovisional patent Ser. No. 17/065,956, filed Oct. 8, 2020 (now also U.S. Pat. No. 11,402,082, granted Aug. 2, 2022), which is a continuation of U.S. Nonprovisional patent Ser. No. 16/786,556, filed Feb. 10, 2020 (now also U.S. Pat. No. 10,837,626, granted Nov. 17, 2020), which is a continuation of U.S. Nonprovisional patent Ser. No. 16/368,993, filed Mar. 29, 2019 (now also U.S. Pat. No. 10,598,354, granted Mar. 24, 2020), which granted patent is itself also a continuation of U.S. Nonprovisional patent Ser. No. 15/158,159, filed May 18, 2016 (now also U.S. Pat. No. 10,288,266, granted May 14, 2019), which granted patent further claims priority to and the benefit of U.S. Provisional Patent Ser. No. 62/163,287, filed May 18, 2015; the contents of all of which as are incorporated herein by reference in their entireties.

BACKGROUND

For recessed lighting applications, individuals desire changeable lighting assemblies that provide desired aesthetics for particular applications. Accordingly, a need exists for new recessed lighting assemblies providing various aesthetic features suitable for various applications.

BRIEF SUMMARY

Various embodiments are directed to an adjustable light fixture comprising a light head, a socket base, and an extender located between the light head and the socket base. The light head comprises a light source, a lens, and a frame; and the extender is configured to move between an extended configuration and a compressed configuration.

In various embodiments, the extender comprises a first component and a second component, wherein the first component and second component are concentric, and wherein the first component is positioned within the second component and the first component configured to slide relative to the second component. Moreover, in various embodiments, the light head comprises the first component and the socket base comprises the second component. Moreover, the first component may be frictionally engaged with the second component. In certain embodiments, the extender is infinitely adjustable between the extended configuration and the compressed configuration.

In certain embodiments, the light head is secured relative to a first of the concentric components and the socket base is secured relative to a second of the concentric components, and wherein the first concentric component is configured to slide within the second concentric component. Moreover, in various embodiments, the extender additionally comprises a guide mechanism configured to prevent portions of the extender from rotating. The guide mechanism may comprise a guide slot defined in the first component and a guide pin extending away from the second component and within the guide slot of the first component. The guide slot may extend parallel to a direction of travel of the first component relative to the second component.

In various embodiments, the socket base comprises a screw-in socket base configured to engage a corresponding screw-in socket of a light assembly. In certain embodiments, the light source comprises one or more light emitting diodes. Moreover, in various embodiments, the light fixture additionally comprises a conductor electrically connecting a portion of the light head with the socket base.

Various embodiments are directed to a method of installing an adjustable light fixture. The adjustable light fixture may comprise a light head, a socket base, and an extender located between the light head and the socket base. In various embodiments, the light head comprises a light source, a lens, and a frame, and the extender is configured to move between an extended configuration and a compressed configuration. The method may comprise steps for: engaging the socket base with a corresponding socket of a lighting assembly; and adjusting the extender toward the compressed configuration such that at least a portion of the light head is positioned within the lighting assembly.

In various embodiments, the extender comprises a first component and a second component concentric with the first component. In various embodiments, the first component is positioned within the second component and the first component is configured to slide relative to the second component. In certain embodiments, adjusting the extender toward the compressed configuration comprises depressing the first component relative to the second component. Moreover, in various embodiments, the light source comprises one or more light emitting diodes. In certain embodiments, the socket base comprises a screw-in base; and engaging the socket base with the corresponding socket comprises screwing the socket base into the corresponding socket.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
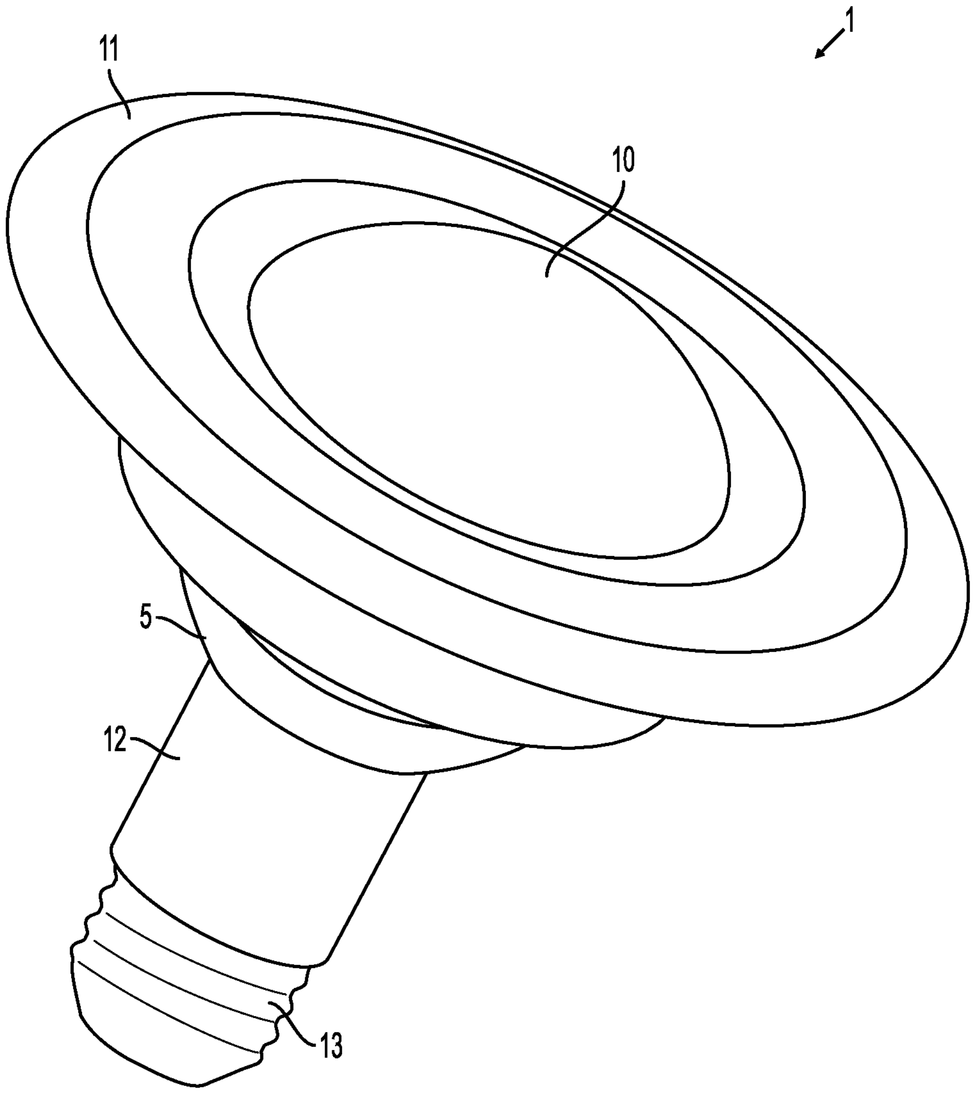
FIG. 1 shows an adjustable light fixture according to various embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to an adjustable light fixture for use in association with a recessed lighting assembly (e.g., a can light). The adjustable light fixture may be configured to adjust between an extended configuration and a compressed configuration such that the length of the adjustable light fixture may be adjusted to correspond to the length of a particular lighting assembly. In various embodiments, the length of the adjustable light fixture may be infinitely adjustable between the extended configuration and the compressed configuration. However, various embodiments of the adjustable light fixture may comprise a plurality of length adjustment settings, such that the length of the light may be adjusted between each of the various length adjustment settings.

The adjustable light fixture may comprise a lighting head comprising one or more light sources (e.g., Light Emitting Diodes), a socket base configured to electrically connect the adjustable light fixture to a power source, and an extender portion between the lighting head and the socket base. The length of the extender portion is adjustable between the extended configuration and the compressed configuration, thereby changing the distance between the lighting head and the socket base. For example, the extender may be configured to periscope between the extended configuration and the compressed configuration.

The adjustable light fixture may thus be configured to retrofit into existing can light assemblies without the use of collapsible springs required to lock into a can light assembly housing to hold to adjustable light fixture in place. Moreover, the adjustable light fixture may be configured to provide the visual aesthetics of a flush mounted light fixture without the use of fixed-length socket extenders to move the lens of a light bulb to a desired distance away from a light socket. Thus, integrating a periscoping extender into an adjustable light fixture enables quick and efficient installation of the adjustable light fixture into an existing recessed can lighting assembly while maintaining consistent and desired light distribution properties from the light source.

As described herein, various embodiments of the adjustable light fixture may comprise a lighting head, a socket base, and an extender located between the lighting head and the socket base. The lighting head may comprise one or more light sources (e.g., Light Emitting Diodes, incandescent lighting filaments, fluorescent bulbs, halogen bulbs, and/or the like) and lighting drivers (e.g., Light Emitting Diode drivers). The lighting head may be in electrical communication with the socket base via one or more conductors within the extender. For example, the one or more conductors providing an electrical conduit between the socket base and the lighting head may comprise one or more insulated flexible wires (e.g., stranded wires and/or solid-core wires), one or more rigid conductors (e.g., one or more extendable rigid conductors), and/or the like.

The socket base may comprise a screw-in socket, a snap-in socket, a pronged socket, and/or the like having one or more electrical contacts configured to provide an electrical connection between the lighting head and an electrical source (e.g., Alternating Current line voltage and/or Direct Current). For example, the socket base may comprise a screw-in base configured to be secured relative to a medium-screw sized socket. As yet another non-limiting example, the socket base may comprise a two-prong base configured to slidably engage a corresponding two-prong socket.

The extender may comprise a rigid telescoping assembly adjustable between an extended configuration and a compressed configuration. As will be described in greater detail herein, the length of the extender may be infinitely adjustable between the extended configuration and the compressed configuration, such that the length of the extender remains unchanged absent the application of an external force. Thus, for example, when the adjustable light fixture is suspended by the socket base, the weight of the extender and/or the lighting head does not cause the extender to move toward the extended configuration.

With reference to FIG. 1, which shows a top perspective view of various embodiments of the adjustable light fixture 1, the lighting head 5 of the adjustable light fixture 1 may comprise a lens 10 and a frame 11. The lens 10 may comprise a transparent and/or translucent material (e.g., glass, plastic, and/or the like) to permit at least a portion of the light emitted by a lighting source (e.g., an incandescent bulb, one or more light emitting diodes (LEDs), a fluorescent light bulb, and/or the like) to pass through. In various embodiments, the lens 10 may be clear, frosted, and/or tinted to provide a desired lighting effect. For example, the lens 10 may be tinted with a particular color (e.g., blue, grey, red, orange, green, and/or the like) to provide a desired lighting color.

Moreover, in various embodiments, the frame 11 may comprise a rigid material (e.g., plastic, metal, wood, and/or the like) surrounding the lens 10. In various embodiments, the frame 11 may comprise an opaque material, however it should be understood that the frame 11 may comprise transparent and/or translucent materials. As will be discussed in reference to FIGS. 3A-3C, the frame 11 may be configured to cover a lighting assembly when the adjustable light fixture is installed therein. In various embodiments, the frame 11 may define an integral molded portion of the lighting head body 6, however, in certain embodiments, the frame 11 and/or the lens 10 may be removable relative to the remaining portion of the lighting assembly 1. For example, the frame 11 and/or the lens 10 may be detachably secured relative to the lighting head body 6 (e.g., via one or more snap-in connectors, threaded connectors, fasteners, and/or the like). In various embodiments, the frame 11 may define a circular perimeter, however the frame 11 may have any of a variety of shapes. Moreover, the frame 11 may be sized to cover one or more lighting assemblies, such as a can light assembly. As non-limiting examples, the frame may have a 5" diameter, a 6" diameter, a 7" diameter, and/or the like.

Figure 2A:
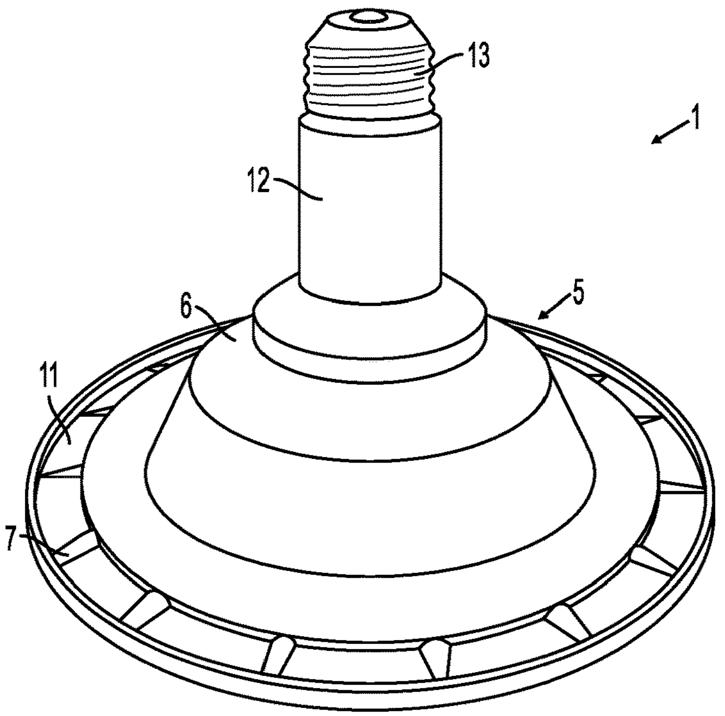
FIGS. 2A-2B show rear views of an adjustable light fixture according to various embodiments.
Figure 2B:
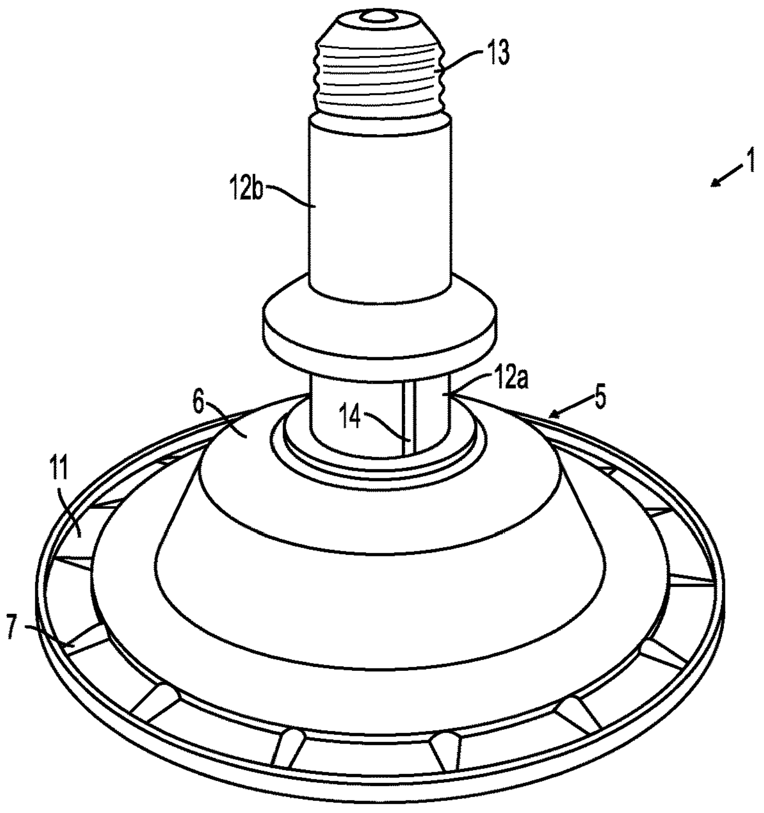

FIGS. 2A-2B illustrate back views of an adjustable light fixture having an extender 12 in (1) a compressed configuration, and (2) an extended configuration, respectively. As shown in FIGS. 2A-2B, the frame 11 may define a generally planar back surface. As shown in FIGS. 2A-2B, the frame 11 may comprise one or more support ribs 7 to provide additional structural support for the frame 11. Moreover, as shown in FIGS. 2A-2B, the lighting head body 6 may extend away from a back side of the frame 11, and may encompass one or more components of a lighting source therein. For example, the lighting head body 6 may encompass a lighting source (e.g., one or more LEDs, incandescent bulbs, and/or fluorescent bulbs), a reflective dome surrounding the lighting source to direct emitted light in a desired direction, one or more lighting source ballast circuits and/or drive circuits, a power converter, and/or the like. Like the frame 11, the lighting head body 6 may comprise a rigid material, such as a plastic material.

With reference again to FIGS. 2A-2B, the lighting assembly 1 may comprise an extender 12 between the lighting head 5 and a socket base 13 configured to electrically connect the light fixture 1 to an electrical source. As shown in FIGS. 2A-2B, the socket base 13 may comprise an Edison socket base, however, any of a variety of socket bases may be utilized, including snap-in connectors, other threaded connectors, and/or the like.

The extender 12 may adjust the distance between the socket base 13 and the lighting head. In various embodiments, the extender 12 may comprise two at least substantially concentric and telescoping rigid components configured to slide relative to one another between the extended configuration and the compressed configuration. In various embodiments, the components of the extender 12 may comprise a rigid, electrically insulative material (e.g., a rigid plastic material). However, in various embodiments the components of the extender 12 may comprise one or more conductors (e.g., metal pins, plates, tubes, and/or the like) configured to provide an electrical conduit between the socket base 13 and various electrical components within the lighting head 5. In such embodiments, the light fixture 1 may not comprise separate conductors (e.g., wires) extending between the socket base 13 and electrical components positioned within the lighting head 5 (e.g., an LED driver, and/or the like).

In various embodiments, the extender 12 may be infinitely adjustable between the extended configuration and the compressed configuration, such that the extender 12 may be configured to maintain any length unless subject to an external force to change the length of the extender 12 (e.g., applied by a user installing and/or uninstalling the light fixture 1). For example, the various concentric components of the extender 12 may be frictionally secured to one another such that the static frictional force generated between the various components may prevent the extender 12 from moving from a selected position without application of an external force.

Moreover, as shown in FIG. 2B, the extender 12 may comprise a male portion 12*a* positioned within and concentric with a female portion 12*b*. As shown in FIG. 2B, the male portion 12*a* of the extender 12 may be a portion of the lighting head (e.g., the male portion 12*a* of the extender 12 may be integrally formed with the lighting head body 6, may be secured (e.g., via one or more fasteners) to the lighting head 5, and/or the like). In various embodiments, the male portion 12*a* of the extender 12 may define a guide slot 14 extending parallel with the direction of travel relative to the female portion 12*b*. In various embodiments, the guide slot 14 may be configured to engage a corresponding guide pin (not shown) secured within the interior of the female portion 12*b* of the extender 12. Collectively, the guide slot 14 and guide pin are configured to permit the male and female portions 12*a*, 12*b* of the extender 12 to slide along a direction of travel relative to one another, while preventing the male and female portions 12*a*, 12*b* from rotating relative to one another. Thus, a rotational force applied to the lighting head 5 is transferred to the socket base 13 of the light fixture 1. For example, during installation of the light fixture, rotating the lighting head 5 causes the socket base 13 to rotate such that the socket base 13 may be screwed into a corresponding socket.

Moreover, with reference again to FIG. 2B, the female portion 12*b* of the extender 12 may be positioned around and concentric with the male portion 12*a* of the extender 12. In various embodiments, the female portion of the extender 12 may be secured relative to the base socket 13. However, it should be understood that in various embodiments the male portion 12*a* and the female portion 12*b* of the extender 12 may be oppositely secured relative to the remaining portion of the lighting assembly (e.g., the male portion 12*a* may be secured relative to the socket base 13 and the female portion 12*b* may be secured relative to the lighting head 5).

In alternative embodiments, the extender 12 may define a plurality of discrete adjustment lengths, such that the length of the extender 12 may be adjustable between any of the various discrete adjustment lengths. Each adjustment length may be associated with one or more fasteners, such as a snap, ledge, pin, and/or other fastener configured to maintain the length of the extender 12 at a particular adjustment length. Adjustment between each of the various adjustment lengths may thus require that the one or more fasteners be disengaged before adjusting the length of the extender 12.

As yet another alternative embodiment, the extender 12 may comprise two corresponding threaded members configured to rotate relative to one another such that rotating the corresponding threaded members in a first direction (e.g., clockwise) may adjust the extender 12 toward the compressed configuration and rotating the corresponding threaded members in a second direction may adjust the extender 12 toward the extended configuration.

Figure 3A:
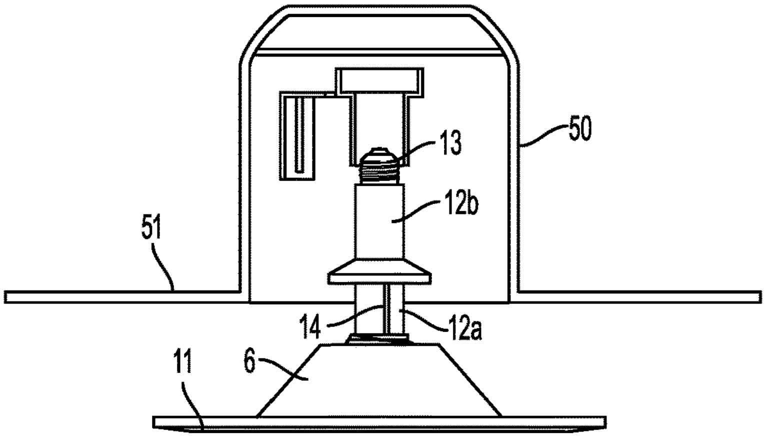
FIGS. 3A-3C illustrate installation steps for installing an adjustable light fixture according to various embodiments.
Figure 3B:
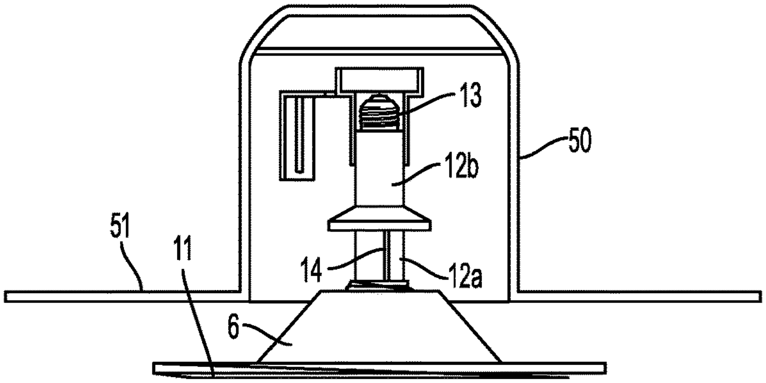
Figure 3C:
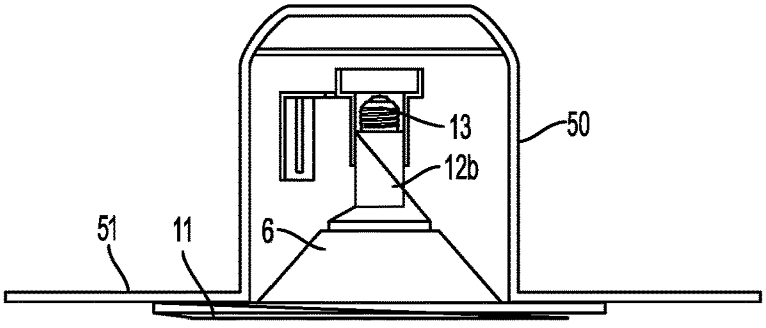

FIGS. 3A-3C illustrate various steps for installing the adjustable light fixture 1 in an existing recessed lighting assembly (e.g., a can light) 50. Although the light fixture 1 is shown installed in a recessed lighting assembly 50, it should be understood that the light fixture 1 may be installed in any of a variety of lighting fixtures.

As illustrated in FIGS. 3A-3C, the adjustable light fixture 1 may be configured to be installed in an existing recessed lighting assembly 50 (e.g., a “can” light). Installation of the adjustable light fixture 1 may comprise steps for (1) engaging the socket base 13 with a corresponding electrical source of the lighting assembly 50 (e.g., by screwing an Edison socket base into a corresponding light socket), as shown in FIG. 3A and (2) adjusting the length of the extender 12 such that the frame 11 engages the surface 51 in which the lighting assembly 50 is installed (e.g., a ceiling), as shown in FIGS. 3B-3C. As shown in FIG. 3C, the outside diameter of the frame 11 may be larger than the diameter of the lighting assembly, such that the frame 11 may completely cover the lighting assembly.

As shown in FIG. 3A, the light fixture 1 may be first secured within the lighting assembly 50 while the extender 12 is in the extended configuration. Particularly for embodiments in which the socket base 13 is a screw-in socket base (e.g., an Edison connector), installation of the light fixture 1 relative to the lighting assembly 50 may comprise rotating the lighting head 5 (thereby causing the socket base 13 to rotate) to screw the light fixture 1 into the lighting assembly 50 until the light fixture 1 is secured within the lighting assembly 50, as shown in FIG. 3B. Once the light fixture 1 is secured within the lighting assembly 50, the extender 12 is compressed toward the compressed configuration, for example, by depressing the lighting head 5 toward the socket base 13. The extender 12 is compressed until the frame 11 is in contact with, or is adjacent the surface 51 in which the lighting assembly 50 is installed. Such positioning provides the appearance of a flush installation of the light fixture 1 within the surface 51.

Figure 4A:
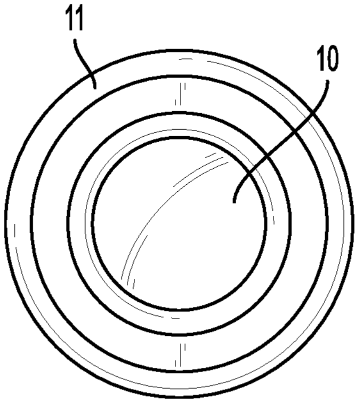
FIGS. 4A-4C illustrate various adjustable light fixture lenses according to various embodiments.
Figure 4B:
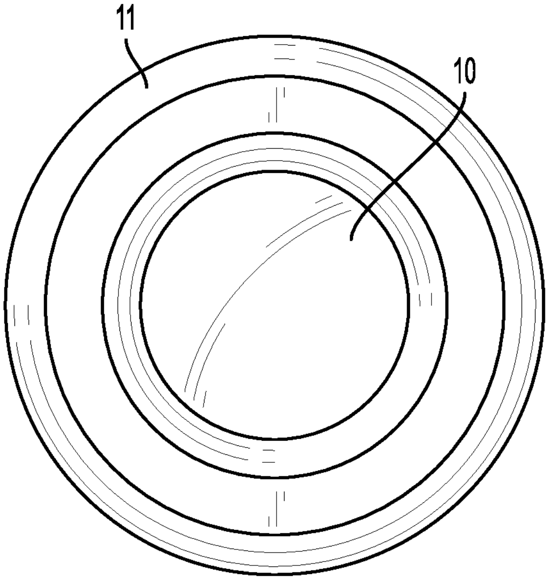
Figure 4C:
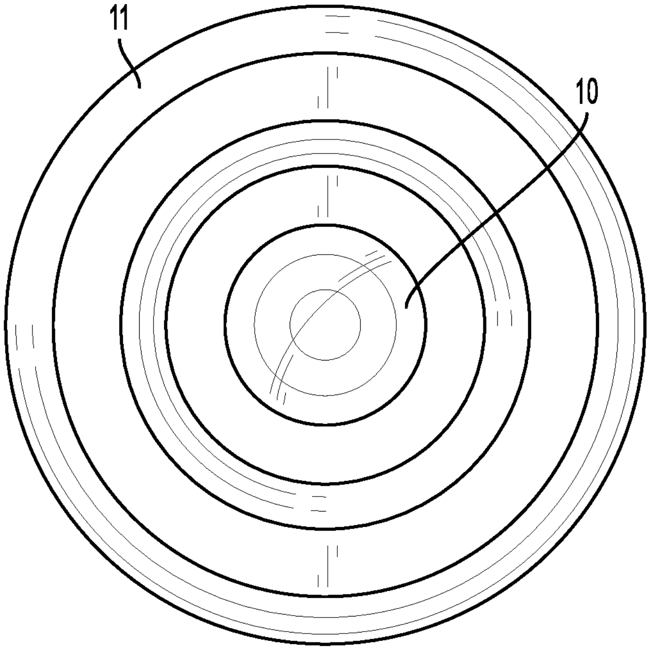

In various embodiments, the adjustable light fixture 1 may be configured to be secured within a variety of different size lighting assemblies 50. For example, the frame 11 of the adjustable light fixture 1 may have any of a variety of outside diameters, such that the frame 11 is configured to cover various size lighting assemblies. For example, the adjustable light fixture 1 may be configured to be secured within a 3 inch diameter can light, a 4 inch diameter can light, a 5 inch diameter can light, and/or a 6 inch diameter can light such that the adjustable light fixture 1 entirely covers the diameter of the light assembly in which it is secured. As shown in FIGS. 4A-4C, the frame may define various diameters and widths relative to the lens 10 to provide a desired aesthetic. For example, as shown in each of FIGS. 4A-4C, the frame may comprise a plurality of frame surface portions each being angled relative to others of the plurality of frame surfaces. As non-limiting examples, the frame 11 may define a simplistic aesthetic having one generally flat frame surface surrounding the lens 10 and extending to a perimeter of the frame 11, or the frame 11 may comprise a plurality of angled frame surfaces between the lens 10 and the perimeter to define a more complex aesthetic.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An extender comprising:

a first component having an external surface with a single elongated slot oriented in its entirety in alignment with a longitudinal axis of the first component; and a second component having an internal surface, wherein:

the external surface of the first component is at least partially positioned in contact with a portion of the internal surface of the second component;

the second component comprises a socket portion having a socket base, and the socket base comprises a screw-in socket base configured to engage a corresponding screw-in socket of a light assembly.

2. The extender of claim 1 wherein the first component is frictionally engaged with the second component.

3. The extender of claim 2, wherein the extender is slidably adjustable between an extended configuration and a compressed configuration.

4. The extender of claim 1, wherein a light head is secured relative to the first component and the socket base is secured relative to the second component.

5. The extender of claim 1, wherein only the second component moves, relative to the first component, in the purely translational direction.

6. The extender of claim 1, wherein:

the first component is secured to and forms part of a lighting portion of an adjustable light fixture; and the lighting portion is a lighting head that comprises a lens, a lighting head body, and a frame surrounding the lens, wherein (a) the lighting head body extends outward from a back surface of the frame and (b) the lens encloses a front opening of the lighting head body.

7. The extender of claim 1, wherein:

the first component is secured to and forms part of a lighting portion of an adjustable light fixture; and the lighting portion is a lighting head that comprises a light source and a lighting head body, wherein the light source is recessed within the lighting head body.

8. The extender of claim 7, wherein the light source comprises one or more light emitting diodes.

9. The extender of claim 1, wherein:

the first component is secured to and forms part of a lighting portion of an adjustable light fixture; and a conductor electrically connects a portion of the lighting portion with the socket portion.

10. A method of adjusting a light fixture, the method comprising the steps of:

providing an extender comprising:

a first component secured to the adjustable light fixture and having an external surface with a single elongated slot oriented in its entirety in alignment with a longitudinal axis of the first component; and a second component having an internal surface, wherein:

the external surface of the first component is positioned in contact with a portion of the internal surface of the second component;

engaging a socket base with a corresponding socket of the adjustable light fixture; and adjusting the second component relative to the first component such that at least a portion of the extender is positioned within the adjustable light fixture.

11. The method of claim 10, wherein the second component comprises a socket portion having the socket base.

12. The method of claim 10, wherein:

adjusting the extender relative to the first component comprises depressing the first component relative to the second component.

13. The method of claim 10, wherein the light fixture comprises a light source comprising one or more light emitting diodes.

14. The method of claim 10, wherein:

the socket base comprises a screw-in base; and engaging the socket base with the corresponding socket comprises screwing the socket base into the corresponding socket.

15. The method of claim 10, wherein only the second component moves, relative to the first component, in the purely translational direction.

16. An extender comprising:

a first component having an external surface with a single elongated slot oriented in its entirety in alignment with a longitudinal axis of the first component; and a second component having an internal surface, wherein:

the external surface of the first component is at least partially positioned in contact with a portion of the internal surface of the second component;

the first component is secured to and forms part of a lighting portion of an adjustable light fixture; and the lighting portion is a lighting head that comprises a lens, a lighting head body, and a frame surrounding the lens, wherein (a) the lighting head body extends outward from a back surface of the frame and (b) the lens encloses a front opening of the lighting head body.

17. The extender of claim 16, wherein one or more of:

the second component comprises a socket portion having a socket base;

the first component is frictionally engaged with the second component; or only the second component moves, relative to the first component, in the purely translational direction.

* * * * *